United States Patent [19]
Suzuki et al.

[11] Patent Number: 5,400,847
[45] Date of Patent: * Mar. 28, 1995

[54] RADIAL TIRE FOR MOTORCYCLE INCLUDING SPIRAL CORD BELT

[75] Inventors: Shigehiko Suzuki, Amagasaki; Itsuo Yasui, Nishinomiya; Sadaaki Naito, Kobe, all of Japan

[73] Assignee: Sumitomo Rubber Industries, Ltd., Kobe, Japan

[ * ] Notice: The portion of the term of this patent subsequent to May 11, 2010 has been disclaimed.

[21] Appl. No.: 135,590

[22] Filed: Oct. 13, 1993

Related U.S. Application Data

[63] Continuation of Ser. No. 692,559, Apr. 29, 1991, abandoned.

[30] Foreign Application Priority Data

May 2, 1990 [JP] Japan ................................. 2-116510

[51] Int. Cl.⁶ .......................... B60C 9/18; B60C 9/20; B60C 9/22; B60C 15/00
[52] U.S. Cl. .................... 152/527; 152/526; 152/531; 152/533; 152/554; 156/117
[58] Field of Search ............... 152/531, 533, 527, 526, 152/554; 156/117

[56] References Cited

U.S. PATENT DOCUMENTS

| | | | |
|---|---|---|---|
| 4,706,724 | 11/1987 | Ohkuni et al. | 152/531 X |
| 4,773,462 | 9/1988 | Ohkuni et al. | 152/531 X |
| 5,209,794 | 5/1993 | Nakasaki | 152/527 |

FOREIGN PATENT DOCUMENTS

| | | | |
|---|---|---|---|
| 0422881 | 4/1991 | European Pat. Off. | 152/533 |
| 2429678 | 1/1980 | France | 152/531 |
| 58-160805 | 9/1983 | Japan . | |
| 61-196803 | 9/1986 | Japan | 152/527 |
| 61-275005 | 12/1986 | Japan | 152/531 |
| 1487426 | 9/1977 | United Kingdom | 152/533 |

OTHER PUBLICATIONS

Translation of Japanese Patent Application 62-80101, Apr. 13, 1987, Kawabata et al., 152/531.
*Mechanics of Pneumatic Tires*, ed. Samuel Clark: US Department of Transportation, Aug. 1981, p. 129.

*Primary Examiner*—Adrienne Johnstone

[57] ABSTRACT

A radial tire for motorcycles which comprises: a carcass ply of organic fiber cords arranged radially at an angle of 70 to 90 degrees to the tire equator and turned up around bead cores to form two turned up portions and a main portion therebetween; and a belt disposed radially outside the carcass and inside a tread, wherein the radial height Ht of the radially outer edge of each carcass turned up portion is 0.5 to 1.2 times the radial height of the tread edge, both from the bead base. The belt is composed of three pieces, two lateral pieces and a central piece therebetween, each piece being made of at least one spirally wound cord having an elastic modulus of not less than 600 kgf/sq.mm and formed by winding spirally a ribbon of rubber in which the at least one cord is embedded. The width of the central piece of the belt is 0.1 to 0.6 times the tread width. The central piece is differed from at least one of the lateral pieces in respect of cord specification and/or cord arrangement.

1 Claim, 4 Drawing Sheets

*Fig. 6*
PRIOR ART
*Fig. 7*
PRIOR ART
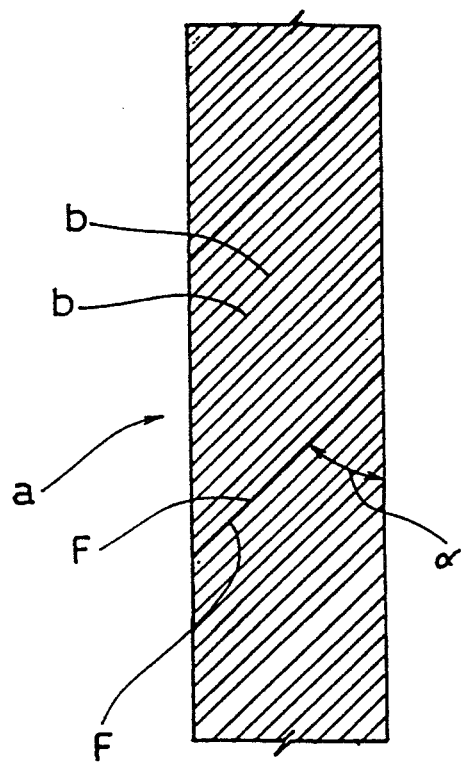
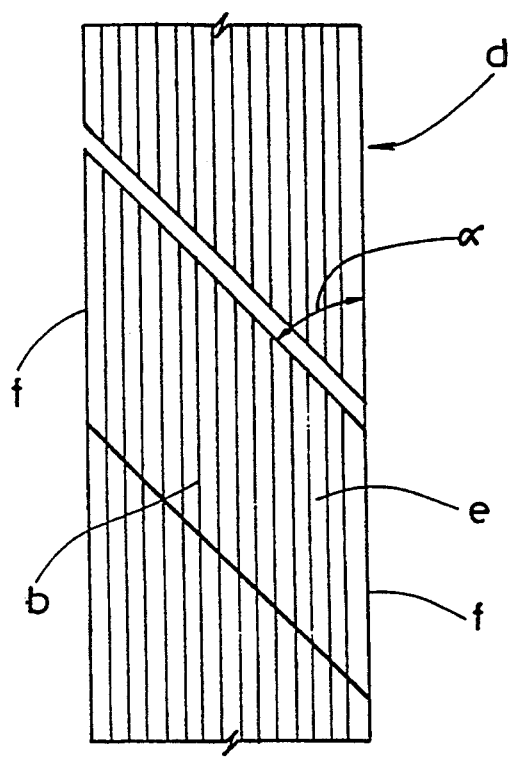

RADIAL TIRE FOR MOTORCYCLE INCLUDING SPIRAL CORD BELT

This application is a continuation of application Ser. No. 07/692,559, filed on Apr. 29, 1991, now abandoned.

The present invention relates to a motorcycle radial tire with a spiral cord belt, In which straight running performance and cornering performance are improved.

BACKGROUND OF THE INVENTION

Recently, a radial ply carcass has been used for motorcycle tires. Such a motorcycle radial tire has been made based on technique for four-wheeled vehicle tires, e.g. passenger car tires. That is, the tire has been provided with a belt reinforcement formed as follows: a rubberized fabric (d) is cut bias at a small angle (alpha) to the cord direction as shown in FIG. 7, which is usually 15 to 30 degrees; and the cut fabric (e) is wound around a carcass with connecting the ends (f) as shown In FIG. 6 to form an annular belt reinforcement (a), and accordingly the laid angle of the belt cords (b) to the tire equator becomes the same bias angle (alpha).

In such a bias belt structure, however, steering stability during straight running and cornering, especially at high speed, is not good.

On the other hand, Japanese Utility-Model Publication No.58-160805 discloses a belt making method, in which a belt cord is wound spirally around the radial carcass and continuously across the tread width at small angles to the circumferential direction of the tire to form a jointless belt. When this is used in the motorcycle tire instead of the conventional belt, steering stability during high speed straight running is improved, but the stability during cornering is not improved contrary to expectation. Further deterioration of tire durability has sometimes been observed.

Thus, it is difficult to satisfy the requirements for cornering and the requirements for straight running at the same time because of the cornering mechanism of the motorcycles which is greatly different from that of the four-wheeled vehicles. That is, the motorcycle is inclined greatly during cornering and accordingly the ground contacting region moves greatly.

SUMMARY OF THE INVENTION

It is therefore, an object of the present invention to provide a motorcycle radial tire having a spiral cord belt, which is improved in cornering performance and durability as well as straight running performance.

According to one aspect of the present Invention a radial tire for motorcycles comprises:
a pair of bead cores disposed one in each bead portion of the tire;
a carcass extending between the bead portions through sidewall portions and a tread portion of the tire, the carcass having at least one ply of organic fiber cords arranged radially at an angle of 70 to 90 degrees to the tire equator and turned up around the bead cores to form two turned up portions and a main portion therebetween;
a tread disposed radially outside the carcass to define the tread portion and curved so that a maximum cross section width of the tire is lying between tread edges; and
a belt disposed radially outside the carcass and inside the tread,
the radial height Ht of the radially outer edge of each carcass turned up portion being 0.5 to 1.2 times the radial height of the tread edge, both from the bead base,
said belt composed of three ply pieces, two lateral pieces and a central piece therebetween, each piece made of at least one spirally wound cord having an elastic modulus of not less than 600 kgf/sq.mm and formed by winding spirally a ribbon of rubber in which said at least one cord is embedded,
the width of the central piece of the belt being 0.1 to 0.6 times the tread width between the edges of the tread,
the central piece differed from at least one of the lateral pieces in respect of at least one of cord material, cord thickness, cord twist, and cord pitches to provide a difference in rigidity between the pieces.

BRIEF DESCRIPTION OF THE INVENTION

An embodiment of the present invention will now be described in detail with reference to the accompanying drawings, in which:

FIGS. 6 and 7 are plan views showing prior arts.

DETAILED DESCRIPTION OF THE INVENTION

Figure 1:
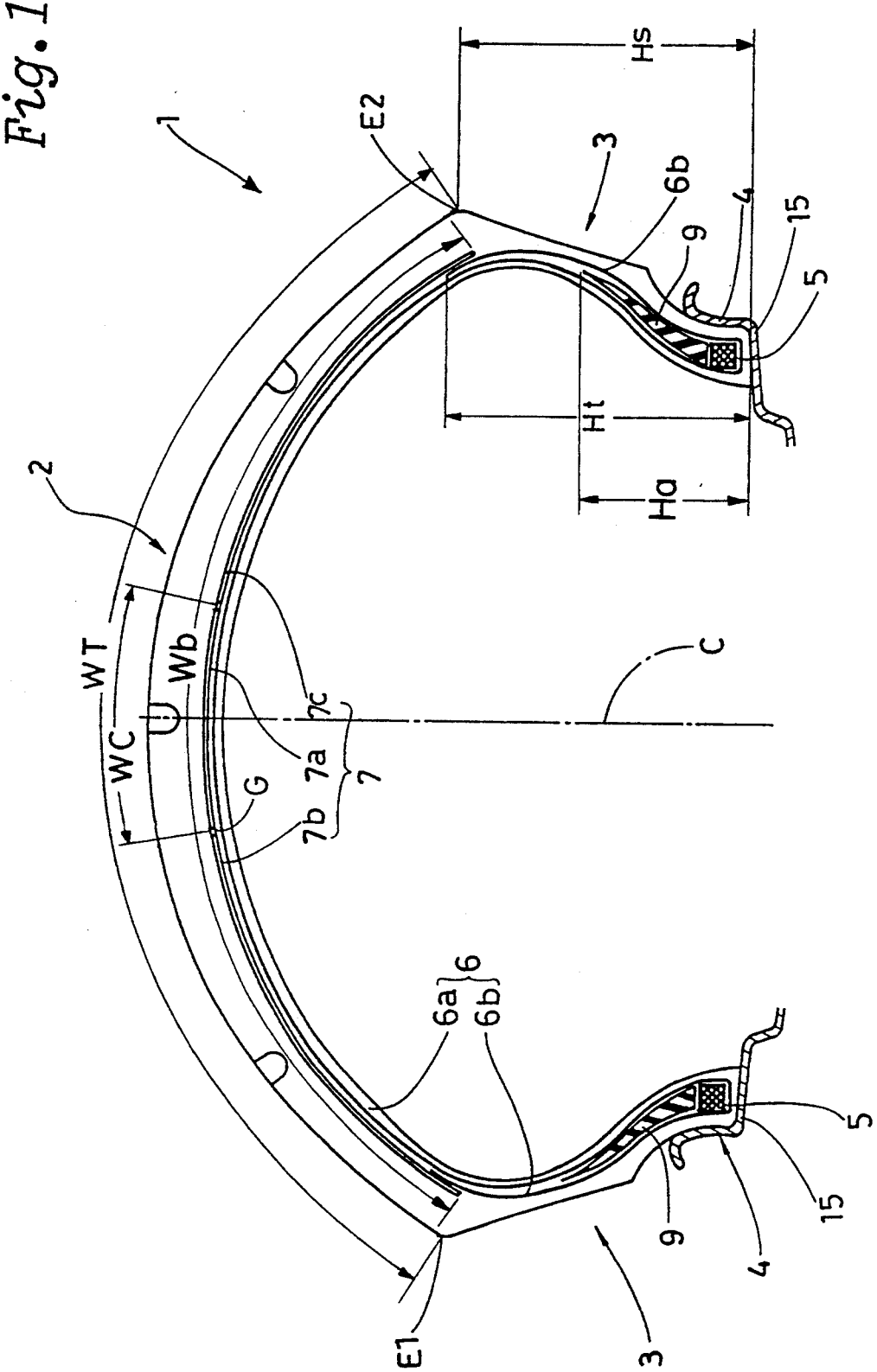
FIG. 1 is a sectional view showing an embodiment of the present invention.

In the figures, motorcycle tire 1 has a tread portion, a pair of bead portions 4, and a pair of sidewall portions 3 extending radially inwardly of the tire from the edges of the tread portion to the bead portions.

The tread portion is curved so that the maximum cross sectional width of the tire lies between the edges E1 and E2 of the tread, and the tread has an arched profile which is generally one third of a circle.

The tire 1 comprises:
a pair of bead cores 5 disposed one in each bead portion 4;
a carcass 6 extending between the bead portions 4 through the sidewall portions 3 and the tread portion 2, and having at least one ply of radially arranged cords turned up around the bead cores 5 from the axially inside to outside thereof to form two turned up portions 6b and a main portion 6a therebetween;
a tread 2 disposed radially outside the carcass to define the tread portion;
a belt 7 disposed radially outside the carcass 6 and inside the tread; and
a bead apex 9 disposed between the carcass main portion 6a and each carcass turned up portion 6b and extending radially outwardly and taperingly from the bead core.

The carcass 6 has one ply of cords arranged radially at an angle of 70 to 90 degrees with respect to the tire equator C.

For the carcass cords, organic fiber cords, e.g. nylon, rayon, polyester, aromatic polyamide and the like can be used.

Each turned up portion 6b is extended radially outwardly to a position in the sidewall portion or tread portion. In this example, this is extended Into the tread portion and sandwiched between the carcass and the belt edge portion.

The radial height Ht of the radially outer edge of the turned up portion is 0.5 to 1.2 times the radial height Hs of the tread edge, both measured from the bead base line 15. When the height Ht is less than 0.5 times the height Hs, the reinforcement becomes insufficient for the bead portion to endure bending deformation, and the durability is deteriorated. When the height Ht is more than 0.5 times the height Hs, the stiffness of the tire becomes excessively increased, and ride comfort is deteriorated.

The bead apex 9 is made of hard rubber having a JIS A hardness of not less than 60. The radial height Ha of the radially outer edge thereof from the bead base line 15 is 0.3 to 0.7 times the radial height Hs of the tread edge from the bead base line 15, and the height Ha is lower than the height Ht.

The belt 7 is made of spirally wound cords, and the belt width Wb measured along the curved belt is 0.7 to 1.0 times the tread width Wt measured between the tread edges E1 and E2 along the tread face.

Figure 2:
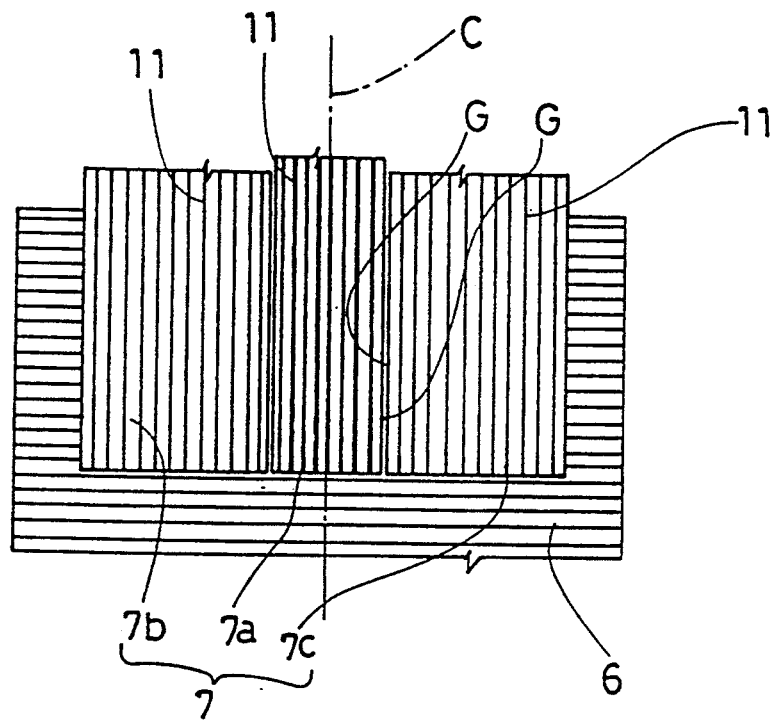
FIG. 2 is a developed plan view showing the arrangement of the carcass cords and the belt cords.

The belt is composed of a three-piece ply made up of a central piece 7a and two lateral pieces 7b and 7c as shown in FIGS. 1 and 2.

The central piece 7a is centered on the tire equator C, and the width WC measured between the edges thereof along the curved piece is 0.1 to 0.6 times the tread width WT measured between the tread edges E1 and E2 along the tread face.

In FIG. 1, the left piece 7b is extended from a position near the left tread edge E1 to the left edge of the central piece 7a, and the right piece 7c is extended from a position near the right tread edge E2 to the right edge of the central piece 7a. When the width WC is less than 0.1 times the tread width WT, the central piece 7a becomes too narrow In width, and the lateral pieces having a different rigidity enter into the ground contacting region in straight running, and therefore, stability is deteriorated. On the other hand, when the width WC is more than 0.6 times the tread width WT, the central piece enters into the ground contacting region In cornering, and cornering performance is deteriorated.

In each ply piece, at least one belt cord 11 is wound spirally and continuously from one edge to the other edge thereof at zero angle or a small angle with respect to the tire equator C.

For the belt cord 11, organic fiber cords, for example polyfluoroethylene (TEFLON), aromatic polyamide, polyester and the like, or steel cords, having a high modulus of elasticity of not less than 600 kgf/sq.mm, are used. When the elastic modulus is less than 600 kgf/sq.mm, the tread portion has an insufficient rigidity, and the directional stability and cornering performance at high speed as well the durability are deteriorated.

Preferably, aromatic polyamide fiber cords having a high modulus of the same level as steel are used.

Figure 3:
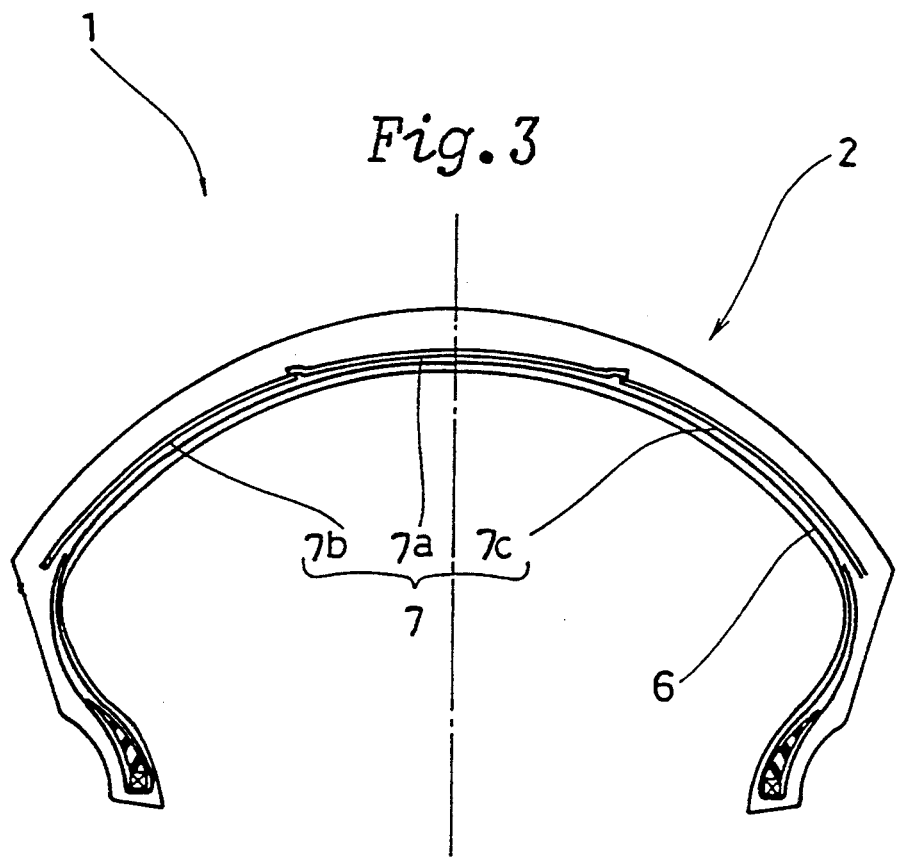
FIG. 3 is a sectional view showing a modification of the belt.

In FIG. 1 and 2, the edges of the axially adjacent pieces are butt jointed and not overlapped. However, as shown in FIG. 3, the pieces 7a, 7b and 7c can be overlapped with each other by a certain width.

Each of the above-mentioned belt ply pieces 7a, 7b and 7c is formed by winding a ribbon 10 around the circumference of the carcass 6.

Figure 4:
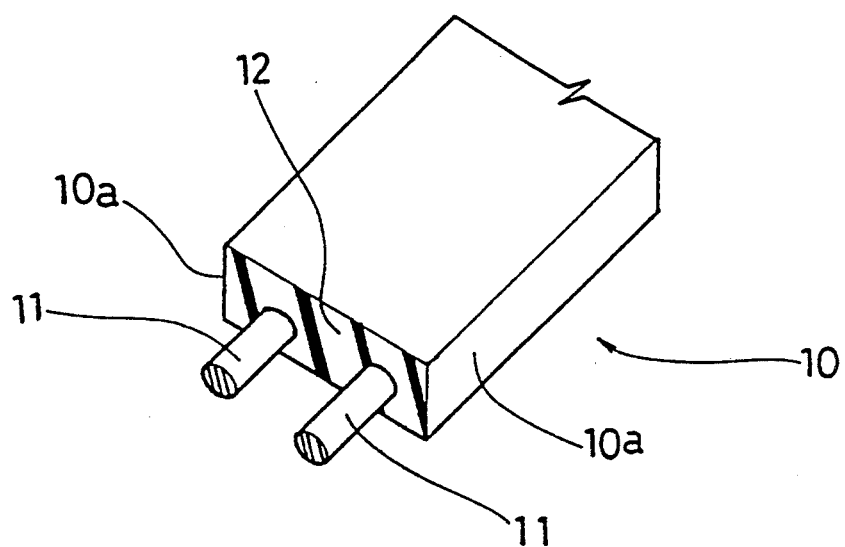
FIG. 4 is a perspective view showing a belt cord ribbon.

The ribbon 10 is, as shown in FIG. 4, a strip of rubber 12 in which a cord or a plurality of parallel cords, in this example, two parallel cords 11 are embedded.

In order to make the three-piece belt 7, three ribbons 10 are used, and they are simultaneously wound around the carcass on a rotating drum as follow:
the ribbon for the left piece 7b is wound from its axially outer edge to inner edge;
the ribbon for the right piece 7c is wound from its axially outer edge to inner edge;
the ribbon for the central piece 7a is wound from its one edge to the other edge, for example from the left edge to the right edge. Thus, the winding time decreases to about one third of the time when the ribbon is wound continuously from one edge to the other edge of the belt.

The ribbons are fed toward the drum as the drum rotates, and by changing the feeding directions of the ribbons, the belt cord inclinations or arrangement can be changed.

If the ribbons for the left piece and central piece are supplied from the same direction and the ribbon for the right piece is supplied from an opposite direction, then the cords in the three pieces 7a, 7b and 7c are inclined in the same direction at small angles to the tire equator. If the ribbons for the right piece and central piece are supplied from the same direction and the ribbon for the left piece is supplied from an opposite direction, then the cords in the right and left pieces 7b and 7c are inclined in the same direction, but the cords in the central piece 7a are inclined in an opposite direction with respect to the tire equator. If the three ribbons are supplied from the same direction, then the cords in the right and left pieces 7b and 7c are inclined in opposite directions with respect to the tire equator. Thus, In the last case, the right and left pieces are symmetrical with respect to the tire equator, but In the former two cases the right and left pieces are asymmetrical.

In the case of FIGS. 1 and 2, preferably, the ends of the ribbons of the adjacent ply pieces are butt jointed and fixed by means of adhesive tape or adhesive agent.

Figure 5:
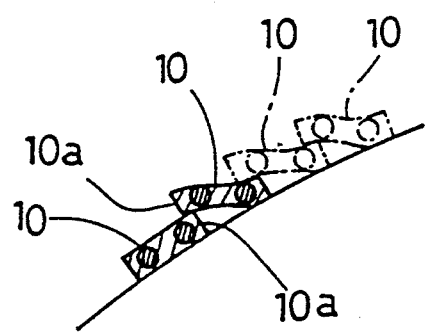
FIG. 5 is a sectional view showing winding of the ribbon.

While the ribbon 10 is being wound, the adjacent edges 10a can be overlapped as shown in FIG. 5, whereby the wound ribbon is prevented from being loosened, and as a result belt edge separation during running is prevented. In FIGS. 4 and 5, the cross sectional shape of the ribbon 10 is a flat rectangle. However, in order to make the overlap smooth, the edges of the ribbon are preferably tapered. Thus, the cross sectional shape may be a flat hexagon, rhombus, trapezoid and the like.

If an axial gap is formed between the axially adjacent edges of the ply pieces, the gap can be remained as it is. However, to reinforce the joint part, such a gap can be covered by a reinforcing strip disposed over the joint part. Further, as mentioned above, the edges can be overlapped with each other.

In order to provide a difference in rigidity between a tread central portion and a tread lateral portion, the central piece 7a is differed from at least one of the lateral pieces 7b and 7c in respect of at least one of the cord specifications, e.g. material, thickness, twist, structure and the like, and the cord arrangement, e.g. inclination, pitch, direction and the like. For example, when the twist of the cord in the central piece 7a is less than that in the lateral pieces 7b and 7c, the tread central portion is provided with rigidity and the tread lateral portions are on the other hand provided with suppleness, thereby improving stability during high speed straight running and road grip during cornering.

Further, the two lateral pieces 7b and 7c can be differed from each other to provide a difference in rigidity or suppleness between the tread lateral regions, which is effective if there is a difference in conditions between the turning directions, for example the radius of left turn is generally smaller than that of right turn.

Test tires of size 170/60VR17 including working example tires 1-5 and reference tires 1-2 having specifications given in Table 1 were made and tested for high speed cornering stability, high speed straight running stability and controlling feel.

The working example tires had the construction shown in FIG. 1, and the reference tire 1 had a conventional belt structure as explained with FIGS. 6 and 7, while the reference tire 2 had a one-piece belt formed by winding a cord ribbon.

In the test, the tire was installed on a motorcycle and run on a test road at 260 km/h (in a straight course) and 220 km/h (in a 400 m radius circular course). Then, using a ten point method, the tire performance was evaluated by rider's feeling. The larger the value, the better the performance.

TABLE 1

|  | Ex. 1 | Ex. 2 | Ex. 3 | Ex. 4 | Ex. 5 | Ref. 1 | Ref. 2 |
| --- | --- | --- | --- | --- | --- | --- | --- |
| CARCASS |  |  |  |  |  |  |  |
| Cord | 1 ply | 1 ply | 1 ply | 1 ply | 1 ply | 2 plies | 1 ply |
|  | nylon 1260d/2 | nylon 1260d/2 | nylon 1260d/2 | nylon 1260d/2 | nylon 1260d/2 | nylon 1260d/2 | nylon 1260d/2 |
| Angle (deg.) | 90 | 90 | 90 | 90 | 90 | 28 | 90 |
| BELT | 3 pieces | 3 pieces | 3 pieces | 3 pieces | 3 pieces | 1-piece | 1-piece |
|  | Spiral | Spiral | Spiral | Spiral | Spiral | Fabric (3 plies) | Spiral |
| Central Piece (7a) |  |  |  |  |  |  |  |
| Cord | aramid 1500d/2 | steel — | aramid 1500d/3 | aramid 1500d/2 | aramid 1500d/2 | nylon 1890d/2 | aramid 1500d/2 |
| Angle (deg.) | $\approx 0$ | $\approx 0$ | $\approx 0$ | $\approx 0$ | $\approx 0$ | 16 | $\approx 0$ |
| Twist (T/10 cm) | 30 | — | 30 | 30 | 30 | — | 30 |
| Lateral Piece (7b) |  |  |  |  |  |  |  |
| Cord | aramid 1500d/2 | aramid 1500d/2 | aramid 1500d/2 | aramid 1500d/3 | aramid 1500d/3 | — | — |
| Angle (deg.) | $\approx 0$ | $\approx 0$ | $\approx 0$ | $\approx 0$ | $\approx 0$ | — | — |
| Twist (T/10 cm) | 35 | 30 | 30 | 25 | 25 | — | — |
| Lateral Piece (7c) |  |  |  |  |  |  |  |
| Cord | aramid 1500d/2 | aramid 1500d/2 | aramid 1500d/2 | aramid 1500d/3 | aramid 1500d/2 | — | — |
| Angle (deg.) | $\approx 0$ | $\approx 0$ | $\approx 0$ | $\approx 0$ | $\approx 0$ | — | — |
| Twist (T/10 cm) | 35 | 35 | 35 | 35 | 30 | — | — |
| TEST RESULTS |  |  |  |  |  |  |  |
| High speed Stability |  |  |  |  |  |  |  |
| Straight running | 8 | 7 | 9 | 8 | 8 | 7 | 8 |
| Cornering | 9 | 8 | 8 | 9 | 9 | 6 | 8 |
| Controlling feel | 8 | 9 | 8 | 9 | 9 | 8 | 8 |

We claim:

1. A radial tire for motorcycles having its maximum cross section width lying between tread edges, comprising:

a pair of bead cores disposed one in each bead portion of the tire;

a carcass extending between the bead portions through sidewall portions and a tread portion of the tire, the carcass having at least one ply of organic fiber cords arranged radially at an angle of 70 to 90 degrees to the tire equator and turned up around the bead cores to form two turned up portions and a main portion therebetween;

a tread disposed radially outside the carcass to define the tread portion; and a belt disposed radially outside the carcass and inside the tread, wherein;

the radial height Ht of the radially outer edge of each carcass turned up portion being 0.5 to 1.2 times the radial height of the tread edge, both from the bead base, said belt comprises two lateral pieces and a central piece therebetween, the central piece being either spaced from or overlapped with each lateral piece, each piece made of at least one spirally wound cord having an elastic modulus of not less than 600 kgf/mm$^2$ and formed by winding spirally a ribbon of rubber in which said at least one cord is embedded, the width of the central piece is 0.1 to 0.6 times the tread width, each turned up portion is extended radially outwardly into the tread portion and sandwiched between the carcass and the belt edge portion, and the twist of the cord in the central piece is less than that in the lateral pieces so that a central region of the tread portion is provided with a larger rigidity than the lateral portions thereof.

* * * * *